Feb. 9, 1943.  J. RAGGI  2,310,808
CUTTING DIES FOR MAKING LEATHER BELT PARTS
Filed May 18, 1942  2 Sheets-Sheet 1

INVENTOR.
Joseph Raggi
BY
ATTORNEY

Feb. 9, 1943. J. RAGGI 2,310,808
CUTTING DIES FOR MAKING LEATHER BELT PARTS
Filed May 18, 1942 2 Sheets-Sheet 2

INVENTOR.
Joseph Raggi
BY
ATTORNEY

Patented Feb. 9, 1943

2,310,808

UNITED STATES PATENT OFFICE 2,310,808

CUTTING DIES FOR MAKING LEATHER BELT PARTS

Joseph Raggi, New York, N. Y.

Application May 18, 1942, Serial No. 443,371

6 Claims. (Cl. 164—25)

This invention relates to new and useful improvements in cutting dies for making leather belt parts.

More specifically, the invention proposes the construction of a press utilizing dies in a manner to cut out leather parts which are adapted to be successively engaged with one another to form a continuous leather belt.

Another object of the invention proposes to provide the press with a vertically reciprocal press head mounted upon a frame having a table portion provided with a plurality of die sections, with one of the die sections being alignable with a complementary die section mounted upon the press head to cut the leather belt part when the die sections are brought together.

A further object of this invention proposes providing the table with an opening adjacent the press head through which the stamped out leather parts are adapted to be discharged in a manner to be collected within a basket which may be placed beneath the opening.

It is a further object of this invention to provide a novel means for transporting the belt parts from the press head to the opening in a manner to discharge therethrough.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
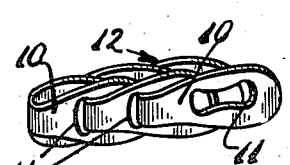
Fig. 1 is a partial perspective view of a belt being constructed of leather parts cut out in accordance with this invention.
Figure 2:
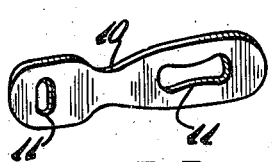
Fig. 2 is a perspective view of one of the parts per se.
Figure 3:
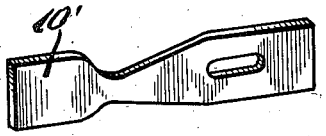
Fig. 3 is a perspective view of the leather part used for finishing the end of the belt.
Figures 4, 10:
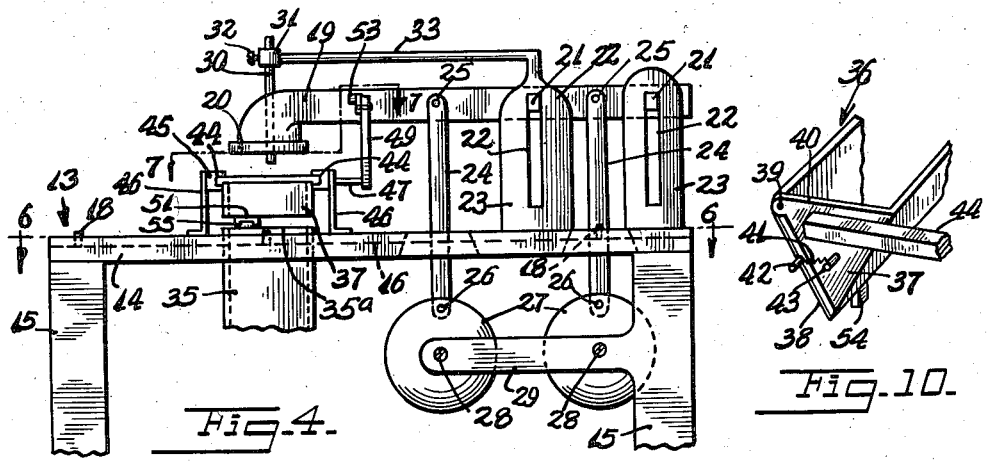
Fig. 4 is a side elevational view of the press used for stamping out the leather parts.
Fig. 10 is a partial perspective view of the conveyor per se.
Figure 7:
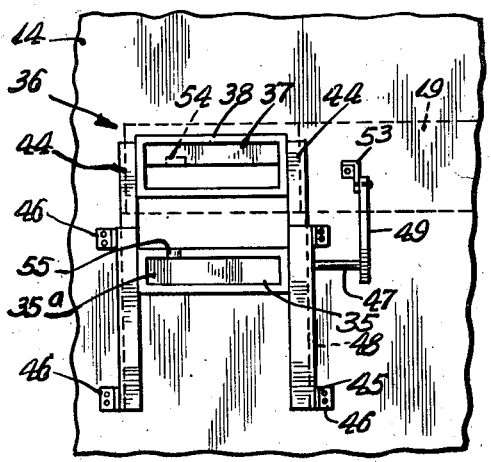
Fig. 7 is a partial enlarged plan view taken substantially on the line 7—7 of Fig. 4.

The cutting dies for making leather belt parts, according to this invention, are to be used for cutting out leather parts such as that shown at 10 in Fig. 2. These parts are to be successively engaged with each other through the openings 11 to form a continuous belt 12, see Fig. 1. The leather 10' shown in Fig. 3 merely differs in shape and is to be used for finishing the end of the belt when the desired length has been reached.

The parts are to be cut out on a press having a frame 13 having a table top 14 which is supported in an elevated horizontal position upon a plurality of legs 15. The top face of the table top 14 is formed with a groove 16 which extends from the front to the rear thereof and in which a plurality of die sections 17 are slidably mounted. These die sections 17 are held against movement relative the table top 14 by means of set screws 18. The set screws 18 are threadedly engaged through the table top and abut the adjacent portions of the die section located therebeneath.

A vertically reciprocal press head 19 is mounted upon the frame 13 and carries a complementary die section 20. The complementary die section 20 is located above one of the die sections 17, and when the superimposed die sections 17 and 20 are brought together upon a piece of leather they will cut out a belt part 10 as shown in Fig. 2. The idle die sections 17 are merely spare ones which are adapted to be successively aligned with the die section 20 to be used in the event the die section 17 aligned with the die section 20 becomes dull.

Means is provided for supporting the press head 19 to slide vertically. This means comprises outwardly extending lugs 21 which project from either side of the rear end of the press head 19. These lugs 21 are slightly rectangular in shape and slidably engage complementary vertically arranged slots 22. The slots 22 are cut in brackets 23 which project vertically upwards from the top 14 of the frame 13.

Rods 24 extend vertically through enlarged openings 25 formed in the table top 14. The top ends of the rods 24 are pivotally connected to the press head 19 by pins 25. The bottom ends of the rods 24 are pivotally attached to pins 26 eccentrically mounted upon discs 27. The discs 27 are concentrically mounted upon driven shafts 28. The driven shafts are rotatively supported in a bracket 29 projecting from one of the legs 15 of the frame 13. Thus, as the discs 27 rotate they cause the press head 19 to move up and down to engage the dies 17 and 20 to cut a leather belt part from a piece of leather being passed between the dies.

The leather part 10 after being cut out is adapted to stick in the die 20 and move upwards with the press head, and means is provided for ejecting the cutout part, from the die 20 in the raised position of the press head 19. This means comprises a vertical ejecting rod 30 which extends through the end of the press head 19 and the die 20. This rod is slidably mounted in a boss 31 and is held in a fixed position by means of a set screw 32 which extends through one side of the boss 31. The boss 31 is mounted upon a supporting structure 33 which extends from certain of the brackets 23.

Adjacent one side of the press head 19 the table top 14 is formed with an opening 34. A chute 35 is projected through the opening 34 and has its top end projecting slightly above the table top 14 forming a mouth 35ª. The bottom end of the chute 35 is arranged to discharge into a basket (not shown on the drawings) which is placed beneath the table top 14.

A conveyor 36 is provided for carrying the cutout parts 10 from the press head 19 after being ejected from the die section 20 to a position over the mouth of the chute 35 to drop into the mouth 35ª and fall down through the chute 35 to discharge through the bottom end thereof into the basket and collect therein. The conveyor 36 is characterized by a container 37 having an open side closed by means of a wall 38. The wall 38 is formed at its top corners with trunnion elements 39 which engage complementary bosses 40 formed adjacent the open side of the container 37. A contraction spring 41 operates between a pin 42 mounted on the wall 38 and a second pin 43 mounted on the side of the container 37 for urging the wall 38 into a closed position across the open side of the container 37.

Rails 44 project from the sides of the container 37 and slidably engage complementary tracks 45. The tracks 45 are formed of lengths of channel shaped material which have their open sides directed inwards. The tracks 45 are supported in an elevated position upon brackets 46 which extend vertically upwards from the table top 14. When the press head 19 is in its raised position, the container 37 is located immediately below the die 20 to catch the belt part being ejected from the die by the ejecting rod 30.

A pin 47 projects from one side rail 44 through a slot 48 formed in the side of the track 45 which supports the rail 44 carrying the pin 47. The outer end of the pin 47 pivotally connects with a connecting rod 49.

Figure 9:
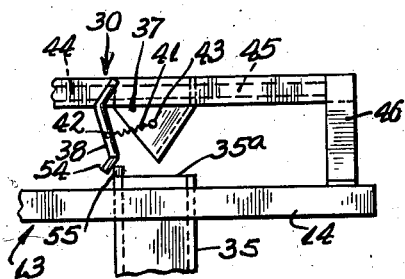
Fig. 9 is a view similar to a portion of Fig. 8 but illustrating a different position of the parts.
Figure 5:
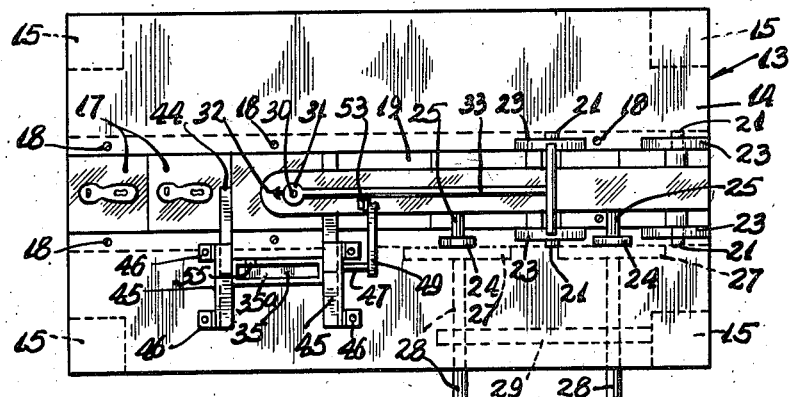
Fig. 5 is a plan view of Fig. 4.
Figure 6:
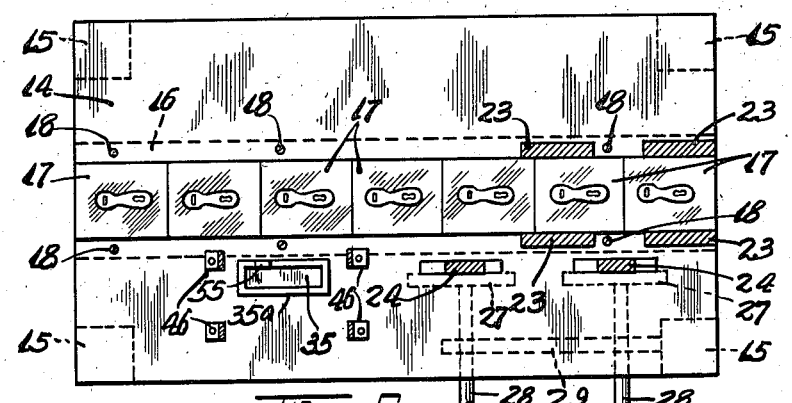
Fig. 6 is a horizontal sectional view taken on the line 6—6 of Fig. 4.
Figure 8:
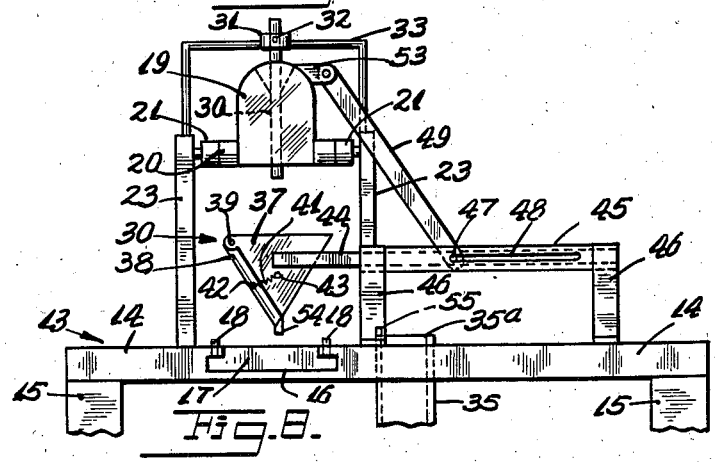
Fig. 8 is a front elevational view of Fig. 4.

The free end of the rod 49 is pivotally attached to a lug 53 mounted upon the side of the press head 19. As the press head moved downwards the container 37 is moved from a position beneath the die 20 to a position over the mouth 35ª of the chute 35 as shown in Fig. 9. In this position a means is provided for opening the wall 38 to permit the belt part to drop out of the container 37 and enter the mouth 35ª of the chute 35. This means comprises a downwardly extending lug 54 formed on the bottom edge of the wall 38 and which is adapted to be engaged by an aligned lug 55 formed on the top edge of the mouth 35ª of the chute 35. When the lugs 54 and 55 engage each other on the movement of the container to a position over the mouth of the chute the wall 38 will be moved to the open position as shown in Fig. 9.

The operation of this invention is as follows:

A die 17 is aligned with the complementary die section 20 and a piece of leather is engaged over the die. The shafts 28 are set in rotation to cause the pressure head 19 to move downwards and engage the die sections 17 and 20 to stamp out the first belt part 10. The press head during this downward movement caused the conveyor 36 to move out from beneath the die section 20. On the upward movement of the press head 19 the cutout belt part 10 will be in the die section 20 and the conveyor 36 will move back to a position beneath the die section 20. As the press head reaches its completely up position the ejecting rod 30 will eject the stamped out part 10 from the die 20 causing it to fall in the container 37 of the conveyor 36.

When the press head moves down again to stamp out the next belt part 10, the container 37 will be moved from its position beneath the die section 20 to a position over the mouth 35ª of the chute 35. As it approaches this latter position, the lugs 54 and 55 will engage each other opening the wall 38 permitting the cutout belt part 10 within the container 37 to drop into the mouth 35ª of the chute 35 and pass through the chute 35 to collect in the basket mounted beneath the bottom end of the chute 35. On the next upward motion of the press head 19 the container 37 will be returned to its position beneath the die section 20, and when the lugs 54 and 55 disengage each other the spring 41 will urge the wall 38 back to the position in which it closes the open side of the container 37. The operation of the press is the same for the formation of each of the cutout belt parts 10.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Cutting dies for making leather belt parts having a table formed with a stationary die section and an opening adjacent said die section and a vertically reciprocal press head carrying a die section cooperative with said die section in a lowered position of said press head for cutting leather belt parts from a piece of leather between said die sections, a chute having its top end extended slightly through said opening and its bottom end discharging into a receiving basket, a horizontally slidable container having a normal position beneath said press head in its raised position to receive a cutout belt part from the die section of said press head, means for moving said container from its position beneath said press head to a position over the top end of said chute when said press head moves downwards, said container having an openable wall resiliently urged closed, and means for opening said wall when said container is above said chute so that said belt part may drop from the container into the top end of the chute to be conveyed to said basket by said chute.

2. Cutting dies for making leather belt parts having a table formed with a stationary die section and an opening adjacent said die section and a vertically reciprocal press head carrying a die section cooperative with said die section in a lowered position of said press head for cutting leather belt parts from a piece of leather between said die sections, a chute having its top end extended slightly through said opening and its bottom end discharging into a receiving basket, a horizontally slidable container having a normal position beneath said press head in its raised position to receive a cutout belt part from the die section of said press head, means for moving said container from its position beneath said press head to a position over the top end of said chute when said press head moves downwards, said container having an openable wall resiliently urged closed, and means for opening said wall when said container is above said chute so that said belt part may drop from the container into the top end of the chute to be conveyed to said basket by said chute, said slidable mounting of said container, comprising spaced elevated tracks mounted on said table and extended along opposite sides of said container, and rails fixedly mounted on the sides of said container and slidably engaging said tracks.

3. Cutting dies for making leather belt parts having a table formed with a stationary die section and an opening adjacent said die section and a vertically reciprocal press head carrying a die section cooperative with said die section in a lowered position of said press head for cutting leather belt parts from a piece of leather between said die sections, a chute having its top end extended slightly through said opening and its bottom end discharging into a receiving basket, a horizontally slidable container having a normal position beneath said press head in its raised position to receive a cutout belt part from the die section of said press head, means for moving said container from its position beneath said press head to a position over the top end of said chute when said press head moves downwards, said container having an openable wall resiliently urged closed, and means for opening said wall when said container is above said chute so that said belt part may drop from the container into the top end of the chute to be conveyed to said basket by said chute, said first means, comprising a rod having one end pivotally attached to said press head, and a pin extending from said container and having the free end of said rod pivotally attached thereto.

4. Cutting dies for making leather belt parts having a table formed with a stationary die section and an opening adjacent said die section and a vertically reciprocal press head carrying a die section cooperative with said die section in a lowered position of said press head for cutting leather belt parts from a piece of leather between said die sections, a chute having its top end extended slightly through said opening and its bottom end discharging into a receiving basket, a horizontally slidable container having a normal position beneath said press head in its raised position to receive a cutout belt part from the die section of said press head, means for moving said container from its position beneath said press head to a position over the top end of said chute when said press head moves downwards, said container having an openable wall resiliently urged closed, and means for opening said wall when said container is above said chute so that said belt may drop from the container into the top end of the chute to be conveyed to said basket by said chute, said openable wall being pivotally mounted at its top, and a contraction spring operating between said container and said wall and comprising the means for resiliently urging said wall closed.

5. Cutting dies for making leather belt parts having a table formed with a stationary die section and an opening adjacent said die section and a vertically reciprocal press head carrying a die section cooperative with said die section in a lowered position of said press head for cutting leather belt parts from a piece of leather between said die sections, a chute having its top end extended slightly through said opening and its bottom end discharging into a receiving basket, a horizontally slidable container having a normal position beneath said press head in its raised position to receive a cutout belt part from the die section of said press head, means for moving said container from its position beneath said press head to a position over the top end of said chute when said press head moves downwards, said container having an openable wall resiliently urged closed, and means for opening said wall when said container is above said chute so that said belt part may drop from the container into the top end of the chute to be conveyed in said basket by said chute, said openable wall being pivotally mounted at its top, and a contraction spring operating between said container and said wall and comprising the means for resiliently urging said wall closed, said latter means, comprising a downwardly extending lug projecting from the bottom edge of said wall, and a lug projecting upwards from the top end of said chute and projected into the path transversed by the lug of said wall to be struck by the lug of said wall to move said wall to an open position as the container approaches its position over said chute.

6. Cutting dies for making leather belt parts having a table formed with a stationary die section and an opening adjacent said die section and a vertically reciprocal press head carrying a die section cooperative with said die section in a lowered position of said press head for cutting leather belt parts from a piece of leather between said die sections, a chute having its top end extended slightly through said opening and its bottom end discharging into a receiving basket, a horizontally slidable container having a normal position beneath said press head in its raised position to receive a cutout belt part from the die section of said press head, means for moving said container from its position beneath said press head to a position over the top end of said chute when said press head moves downwards, said container having an openable wall resiliently urged closed, and means for opening said wall when said container is above said chute so that said belt part may drop from the container into the top end of the chute to be conveyed to said basket by said chute, said openable wall being pivotally mounted at its top, and a contraction spring operating between said container and said wall and comprising the means for resiliently urging said wall closed, said pivotal mounting of said wall, comprising bosses extending from the top of the open side of said container, and trunnion elements mounted on the top corners of said wall and turnably engaging complementary openings formed in said bosses.

JOSEPH RAGGI.